US012542095B2

(12) United States Patent
Cha et al.

(10) Patent No.: US 12,542,095 B2
(45) Date of Patent: Feb. 3, 2026

(54) DISPLAY DEVICE

(71) Applicant: SAMSUNG DISPLAY CO., LTD., Yongin-si (KR)

(72) Inventors: Nahyeon Cha, Yongin-si (KR); Kyungho Kim, Yongin-si (KR); Gichang Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/825,169

(22) Filed: Sep. 5, 2024

(65) Prior Publication Data

US 2025/0157392 A1 May 15, 2025

(30) Foreign Application Priority Data

Nov. 10, 2023 (KR) ........................ 10-2023-0155150

(51) Int. Cl.
*G09G 3/32* (2016.01)

(52) U.S. Cl.
CPC ....... *G09G 3/32* (2013.01); *G09G 2300/0426* (2013.01); *G09G 2310/08* (2013.01)

(58) Field of Classification Search
CPC .... G09G 3/3233; G09G 2310/08; G09G 3/32; G09G 2300/0426; G09G 2300/0842; G09G 2230/00; G09G 2320/0233
See application file for complete search history.

(56) References Cited

U.S. PATENT DOCUMENTS

| | | | | |
|---|---|---|---|---|
| 8,817,008 | B2 | 8/2014 | Park et al. | |
| 11,114,026 | B2 | 9/2021 | Kim et al. | |
| 11,810,511 | B2 | 11/2023 | Kim et al. | |
| 11,817,043 | B2 * | 11/2023 | Park | G09G 3/3266 |
| 2020/0302860 | A1 * | 9/2020 | Kim | G09G 3/325 |
| 2024/0339077 | A1 * | 10/2024 | Li | G09G 3/3208 |

FOREIGN PATENT DOCUMENTS

| | | | |
|---|---|---|---|
| KR | 10-0832102 | B1 | 5/2008 |
| KR | 10-1040786 | B1 | 6/2011 |
| KR | 10-1950844 | B1 | 2/2019 |
| KR | 10-2484382 | B1 | 1/2023 |
| KR | 10-2023-0030130 | A | 3/2023 |

* cited by examiner

*Primary Examiner* — Muhammad N Edun
(74) *Attorney, Agent, or Firm* — F. CHAU & ASSOCIATES, LLC

(57) ABSTRACT

A display device includes a display panel driven in units of frames and include a pixel including a pixel driving circuit and a light-emitting element. The pixel driving circuit may include a first driving sub-transistor, a second driving sub-transistor, and a luminance transistor. The first driving sub-transistor includes a first electrode connected to a first node and a gate electrode connected to a second node. The second driving sub-transistor includes a gate electrode connected to the second node. The luminance transistor includes a first electrode connected to the first node, a second electrode connected to a third node, and a gate electrode which receives a luminance signal. The frame may include a first frame and a second frame, and the luminance signal may be activated in the first frame to have a first pulse width and may be activated in the second frame to have a second pulse width.

20 Claims, 6 Drawing Sheets

DISPLAY DEVICE

CROSS-REFERENCE TO RELATED APPLICATIONS

This U.S. non-provisional patent application claims priority under 35 U.S.C. § 119 of Korean Patent Application No. 10-2023-0155150, filed on Nov. 10, 2023, the entire contents of which are hereby incorporated by reference.

BACKGROUND

1. Technical Field

One or more embodiments described herein relate to a display device.

2. Discussion of Related Art

A display device may include various electronic components such as a display panel for displaying an image, an input sensor for sensing an external input, and an electronic module. The electronic components may be electrically connected to each other via signal lines arranged in various ways. The display panel includes a plurality of pixels. Each of the plurality of pixels includes a light-emitting element for generating light and a pixel driving circuit for controlling the amount of a current which flows to the light-emitting element.

SUMMARY

The present disclosure provides a display device having improved display quality.

An embodiment of the inventive concept provides a display device including a display panel which is driven in units of frames and includes a pixel including a pixel driving circuit and a light-emitting element electrically connected to the pixel driving circuit, wherein the pixel driving circuit may include a first capacitor connected between a second node and a first voltage line to which a first driving voltage is provided, a (1-1)-th transistor including a first electrode electrically connected to the first voltage line and connected to a first node, a second electrode electrically connected to a third node, and a gate electrode electrically connected to the second node, a (1-2)-th transistor including a first electrode electrically connected to the third node, a second electrode electrically connected to the light-emitting element, and a gate electrode electrically connected to the second node, and a luminance transistor including a first electrode electrically connected to the first node, a second electrode electrically connected to the third node, and a gate electrode configured to receive a luminance signal. The frame may include a first frame and a second frame which are in series. The luminance signal may be activated in the first frame to have a first pulse width, and may be activated in the second frame to have a second pulse width different from the first pulse width.

In an embodiment, the display panel may have a first luminance value in the first frame and have, in the second frame, a second luminance value which is greater than the first luminance value, and the second pulse width may be greater than the first pulse width.

In an embodiment, the frame may further include a third frame which is consecutive to the second frame, and a fourth frame which is consecutive to the third frame, and the luminance signal may be activated in the third frame to have a third pulse width, and may be activated in the fourth frame to have a fourth pulse width different from the third pulse width.

In an embodiment, the display panel may have, in the third frame, a third luminance value which is greater than the second luminance value and have, in the fourth frame, a fourth luminance value which is greater than the third luminance value.

In an embodiment, the first pulse width to the fourth pulse width may be gradually or progressively increased in this order.

In an embodiment, the frame may further include a fifth frame, a sixth frame, a seventh frame, and an eighth frame, which are driven consecutively, the luminance signal may be activated in the fifth frame to have a fifth pulse width, may be activated in the sixth frame to have a sixth pulse width, may be activated in the seventh frame to have a seventh pulse width, and may be activated in the eighth frame while to have eighth pulse width, and the fifth pulse width to the eighth pulse width may be different from each other.

In an embodiment, the display panel may have a fifth luminance value in the fifth frame, a sixth luminance value in the sixth frame, a seventh luminance value in the seventh frame, and an eighth luminance value in the eighth frame, and the fifth luminance value to the eighth luminance value may be gradually or progressively decreased in this order.

In an embodiment, the fifth pulse width to the eighth pulse width may be gradually or progressively decreased in this order.

In an embodiment, the pixel driving circuit may further include a second transistor including a first electrode electrically connected to a data line to which a data signal is provided, a second electrode electrically connected to the first node, and a gate electrode configured to receive a first scan signal.

In an embodiment, the pixel driving circuit may further include a third transistor including a first electrode electrically connected to the second node, a second electrode electrically connected to the second electrode of the (1-2)-th transistor, and a gate electrode configured to receive the first scan signal.

In an embodiment, the pixel driving circuit may further include a fourth transistor including a first electrode electrically connected to the second node, a second electrode electrically connected to a first initialization voltage line to which a first initialization voltage is provided, and a gate electrode configured to receive a second scan signal.

In an embodiment of the inventive concept, a display device includes a display panel which is driven in units of frames and includes a pixel including a pixel driving circuit and a light-emitting element electrically connected to the pixel driving circuit, wherein the pixel driving circuit may include a (1-1)-th transistor electrically connected to a first voltage line to which a first driving voltage is provided, electrically connected between a first node and a second node, and including a gate electrode, a (1-2)-th transistor electrically connected between the second node and the light-emitting element and including a gate electrode electrically connected to the gate electrode of the (1-1)-th transistor, and a luminance transistor which is electrically connected between the first node and the second node and receives a luminance signal. The display panel may be driven in a first mode, a second mode, and a third mode, in the first mode, the (1-1)-th transistor and the (1-2)-th transistor may be activated, and the display panel may have a first luminance value, in the second mode, the (1-2)-thg transistor and the luminance transistor may be activated, and the display panel may gradually or progressively change in luminance value from the first luminance value to a second luminance value which is different from the first luminance value. In the third mode, the (1-1)-th transistor and the luminance transistor may be activated, and the display panel may have the second luminance value.

In an embodiment, the second luminance value may be greater than the first luminance value.

In an embodiment, the luminance signal may be deactivated in the first mode, and the luminance signal may be activated in the second mode and the third mode.

In an embodiment, the second mode may be disposed between the first mode and the third mode.

In an embodiment, the second mode may be driven for a plurality of second frames, and pulse widths of the luminance signal activated in each of the plurality of second frames may be gradually or progressively increased.

In an embodiment, the third mode may be driven for a third frame, and a pulse width of the luminance signal activated in the third frame may be greater than the pulse widths of the luminance signal activated in each of the plurality of second frames.

In an embodiment, the pixel driving circuit may further include a second transistor which is electrically connected between a data line to which a data signal is provided and the first node, and receives a first scan signal.

In an embodiment, the pixel driving circuit may further include a third transistor which is electrically connected between the gate electrode of the (1-2)-th transistor and the (1-2)-th transistor and receives the first scan signal.

In an embodiment, the pixel driving circuit may further include a fourth transistor which is electrically connected between the gate electrode of the (1-2)-th transistor and a first initialization voltage line to which a first initialization voltage is provided, and receives a second scan signal.

In accordance with one or more embodiments, a pixel includes a light-emitting element; and a driving transistor connected to the light-emitting element, wherein the driving transistor includes a first driving transistor and a second driving transistor connected in series, the first driving transistor and the second driving transistor configured to generate a driving current for the light-emitting element in a first mode based on a first width of a luminance signal, the second driving transistor but not the first driving transistor configured to generate the driving current in a second mode based on a second width of the luminance signal, and the second driving transistor but not the first driving transistor configured to generate the driving current in a third mode based on a third width of the luminance signal, and wherein the first width, the second width, and the third width are different from each other.

The luminance transistor may be coupled to the first driving transistor in parallel, wherein a gate of the luminance transistor is coupled to receive the luminance signal and wherein the first driving transistor is electrically connected in the pixel when the luminance signal has a first logical value in the first mode and the first driving transistor is electrically disconnected from the pixel when the luminance signal has a second logical value in the second mode and the third mode. The second width may be greater than the first width, and the third width may be greater than the second width.

The driving transistor may have a first channel length equal to a sum of a channel length of the first driving transistor and a channel length of the second driving transistor in the first mode, and the driving transistor may have a second channel length equal to the channel length of the second driving transistor in each of the second mode and the third mode.

The light-emitting element may generate light in the first mode with a first luminance value, may generate light in the second mode with a second luminance value, and may generate light in the third mode with a third luminance value, and wherein the second luminance value is greater than the first luminance value and the third luminance value is greater than the second luminance value.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
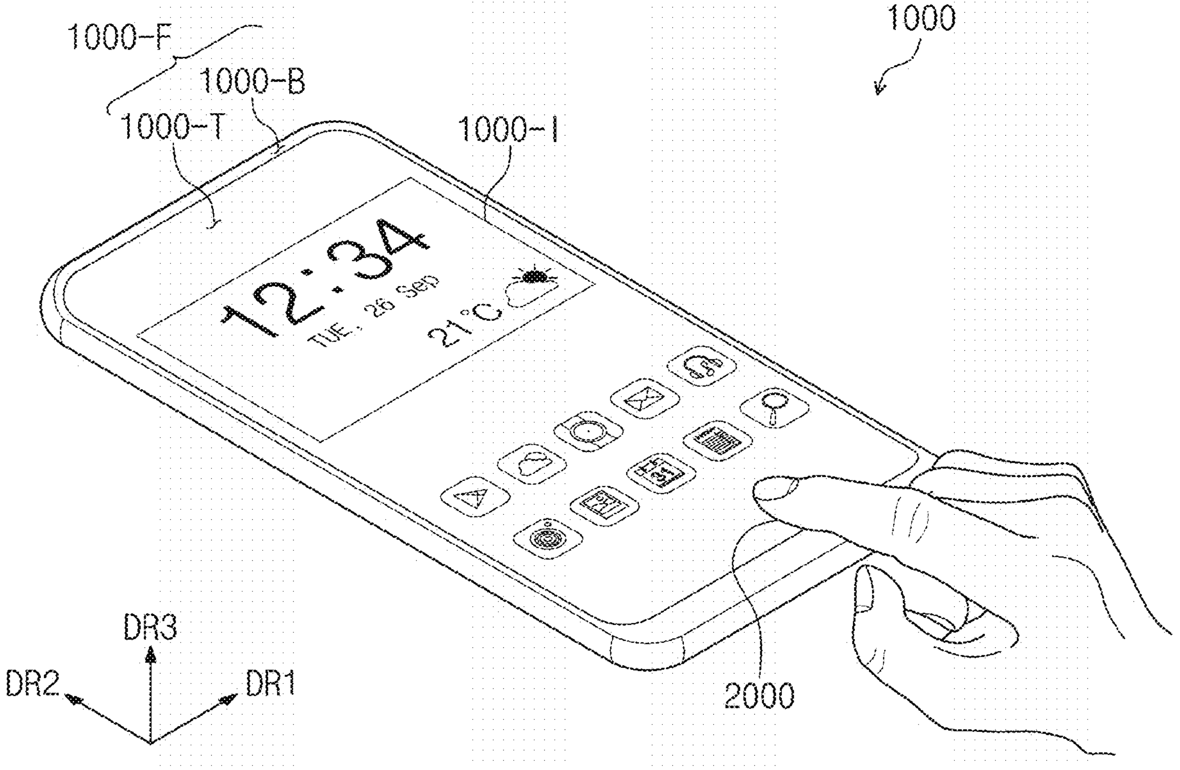
FIG. 1 is a perspective view of a display device according to an embodiment of the inventive concept.

In this specification, it will be understood that when an element (or a region, a layer, a portion, or the like) is referred to as being "on", "connected to" or "coupled to" another element, it may be directly disposed on, connected or coupled to the other element, or an intervening element may be disposed therebetween.

Like reference numerals or symbols refer to like elements throughout. Also, in the drawings, the thicknesses, ratios, and dimensions of elements are exaggerated for effective description of technical contents. The term "and/or" includes all of one or more combinations which the associated elements may define.

Although the terms first, second, etc. may be used to describe various elements, these elements should not be limited by these terms. These terms are only used to distinguish one element from another element. For example, a first element may be referred to as a second element, and similarly, a second element may also be referred to as a first element without departing from the scope of the present disclosure. The singular forms include the plural forms as well unless the context clearly indicates otherwise.

Also, terms such as "below", "lower", "above", "upper" are used to describe the relationships of the elements illustrated in the drawings. These terms have relative concepts and are described on the basis of the directions indicated in the drawings.

It will be understood that the terms such as "include" or "have", when used herein, are intended to specify the presence of stated features, integers, steps, operations, elements, components, or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present disclosure belongs. In addition, terms, such as those defined in commonly used dictionaries, should be interpreted as having a meaning that is consistent with their meaning in the context of the relevant art and should not be interpreted in an overly idealized or overly formal sense unless expressly so defined herein.

Hereinafter, embodiments of the inventive concept will be described with reference to the accompanying drawings.

FIG. 1 is a perspective view of a display device 1000 according to an embodiment of the inventive concept.

Referring to FIG. 1, the display device 1000 may be activated in response to an electrical signal. The display device 1000 may be embodied in various forms. For example, the display device 1000 may be used in a large-sized display apparatus (e.g., a television, a monitor, or an outdoor billboard) or a small- or medium-sized display apparatus such as a personal computer, laptop, personal digital assistant, car navigation unit, game console, portable electronic apparatus, or camera. These are merely presented as examples. In other embodiments, the display device 1000 may be employed in other electronic apparatuses without departing from the scope of the inventive concept. In this embodiment, a smartphone is illustrated as an example of the display device 1000.

The display device 1000 may include a display surface 1000-F parallel to a plane extending in a first direction DR1 and a second direction DR2 crossing the first direction DR1. The display surface 1000-F may include a transmission region 1000-T and a bezel region 1000-B.

An image 1000-I may be displayed toward a third direction DR3 in the transmission region 1000-T. The third direction DR3 may be referred to as a thickness direction. The image 1000-I may include a static image as well as a dynamic (or moving) image. FIG. 1 illustrates a clock screen and icons as an example of the image 1000-I. The display surface 1000-F on which the image 1000-I is displayed may correspond to a front surface of the display device 1000.

In this embodiment, a front surface (or an upper surface) and a rear surface (or a lower surface) of the display device 1000 may be determined, for example, on the basis of a direction in which the image 1000-I is displayed. The front surface and the rear surface may be opposed to each other in the third direction DR3, and a normal direction of each of the front surface and the rear surface may be parallel to the third direction DR3. As used herein, the wording "when viewed on a plane" may mean being viewed in the third direction DR3. The image 1000-I may not be displayed in the bezel region 1000-B.

The display device 1000 according to an embodiment of the inventive concept may sense an input from a user. For example, the display device 1000 may sense an input made from part of a user's body 2000, e.g., a finger. The user input may include external inputs in various forms such as a part of the user's body or from a stylus, light, heat, or pressure. In addition, the display device 1000 may sense an input applied to a side surface or a rear surface of the display device 1000 depending on a structure of the display device 1000, and is not limited to any one embodiment.

Figure 2:
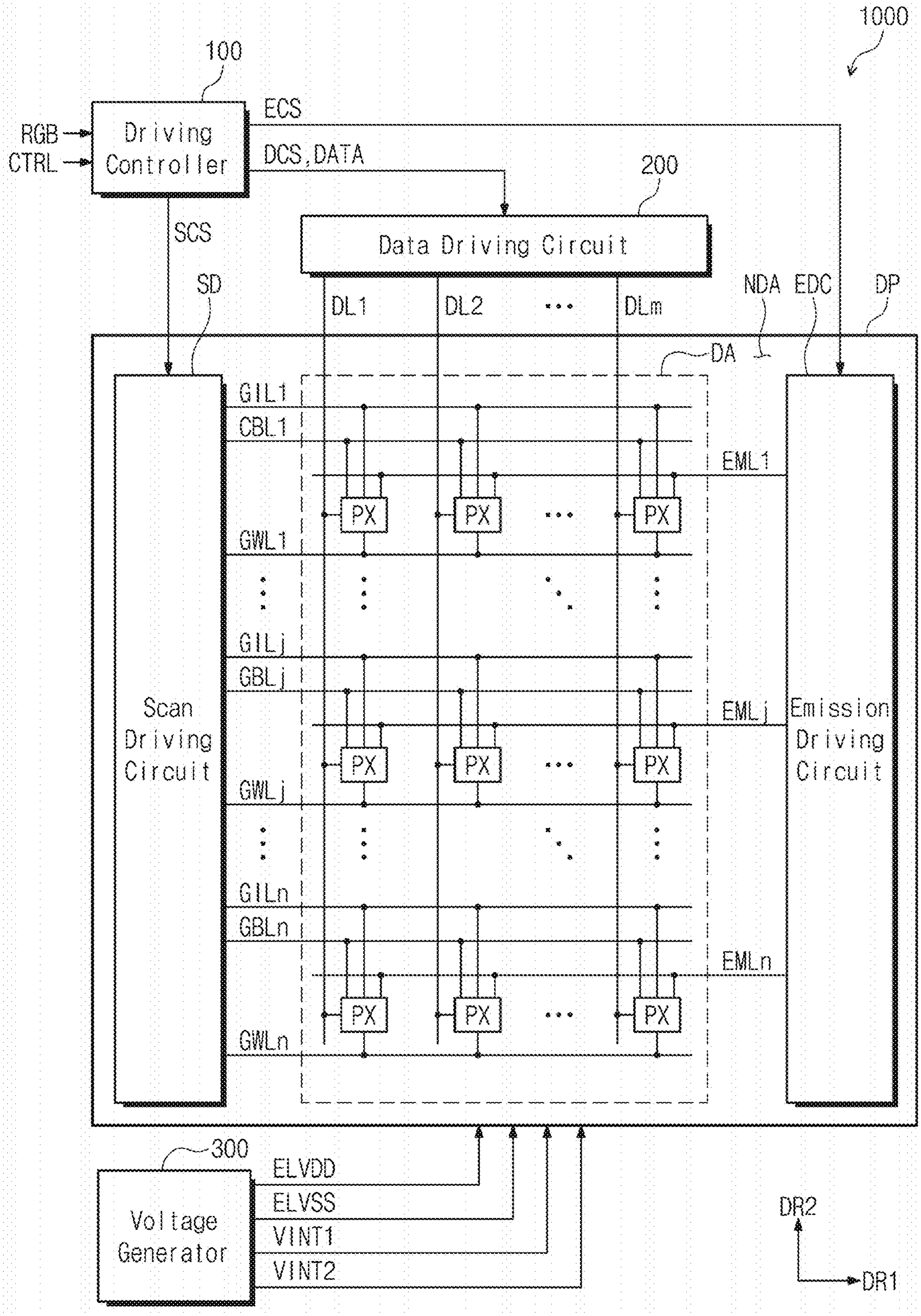
FIG. 2 is a block diagram of a display device according to an embodiment of the inventive concept.

FIG. 2 is a block diagram of the display device 1000 according to an embodiment of the inventive concept.

Referring to FIG. 2, the display device 1000 includes a display panel DP, a driving controller 100, a data driving circuit 200, and a voltage generator 300.

The driving controller 100 receives image information RGB and a control signal CTRL. The driving controller 100 generates image data DATA by converting a data format of the image information RGB to comply with specifications of the interface with the data driving circuit 200. The driving controller 100 outputs a scan control signal SCS, a data control signal DCS, and an emission control signal ECS.

The data driving circuit 200 receives the data control signal DCS and the image data DATA from the driving controller 100. The data driving circuit 200 converts the image data DATA to data signals and outputs the data signals to a plurality of data lines DLI to DLm to be described later. The data signals are analog voltages corresponding to gray scale values of the image data DATA.

The voltage generator 300 generates voltages that are used for operation of the display panel DP. In this embodiment, the voltage generator 300 generates a first driving voltage ELVDD, a second driving voltage ELVSS, a first initialization voltage VINT1, and a second initialization voltage VINT2.

The display panel DP includes scan lines GIL1 to GILn and GWL1 to GWLn, emission control lines EML1 to EMLn, luminance control lines CBL1 to CBLn, data lines DLI to DLm, and a plurality of pixels PX. The scan lines GIL1 to GILn and GWL1 to GWLn may include first scan lines GIL1 to GILn and second scan lines GWL1 to GWLn. The display panel DP may further include a scan driving circuit SD and an emission driving circuit EDC. In an embodiment, the scan driving circuit SD is arranged on a first side of the display panel DP. The scan lines GIL1 to GILn and GWL1 to GWLn and the luminance control lines CBL1 to CBLn extend in a first direction DR1 from the scan driving circuit SD.

The display panel DP includes a display region DA corresponding to the transmission region 1000-T and a non-display region NDA corresponding to the bezel region 1000-B (e.g., see FIG. 1). The plurality of pixels PX may be disposed in the display region DA, and the scan driving circuit SD and the emission driving circuit EDC may be disposed in the non-display region NDA.

The emission driving circuit EDC is arranged on a second side of the display panel DP. The second side of the display panel DP may be an opposing side relative to the first side of the display panel DP. The emission control lines EML1 to EMLn may extend from the emission driving circuit EDC in a direction opposite to the first direction DR1.

The first scan lines GIL1 to GILn, the second scan lines GWL1 to GWLn, the emission control lines EML1 to EMLn, and the luminance control lines CBL1 to CBLn are arranged to be spaced apart from each other in a second direction DR2. The data lines DLI to DLm extend in a direction opposite to the second direction DR2 from the data driving circuit 200 and are arranged to be spaced apart from each other in the first direction DR1.

In an example illustrated in FIG. 2, the scan driving circuit SD and the emission driving circuit EDC are arranged to face each other with the plurality of pixels PX therebetween, but an embodiment of the inventive concept is not limited thereto. For example, the scan driving circuit SD and the emission driving circuit EDC may be disposed to be adjacent to each other on either the first side or the second side of the display panel DP. In an embodiment, the scan driving circuit SD and the emission driving circuit EDC may be configured as a single circuit.

The plurality of pixels PX are electrically connected to respective ones of the first scan lines GIL1 to GILn, the second scan lines GWL1 to GWLn, the emission control lines EML1 to EMLn, the luminance control lines CBL1 to CBLn, and the data lines DLI to DLm. In one embodiment, each of the plurality of pixels PX may be electrically connected to two scan lines, one luminance control line, and one emission control line. For example, as illustrated in FIG. 2, pixels in a first row may be connected to the first scan line GIL1, the second scan line GWL1, the luminance control line CBL1, and the emission control line EML1. In addition, pixels in a j-th row may be connected to the first scan line GILj, the second scan line GWLj, the luminance control lines CBLj, and the emission control line EMLj. The second scan line GWLj may be connected to a plurality of transistors included in a single pixel PX. For example, the second scan line GWLj may be connected to respective gate electrodes of a second transistor T2, a third transistor T3, and a seventh transistor T7 as shown, for example, in FIG. 3.

Each of the plurality of pixels PX includes a light-emitting diode ED and a pixel circuit part PXC (see FIG. 3) for controlling emission of light from the light-emitting diode ED. The pixel circuit part PXC may include one or more transistors and one or more capacitors. The scan driving circuit SD and the emission driving circuit EDC may include transistors which, for example, may be formed through the same process used to form the transistors in the pixel circuit part PXC. In other embodiments, the transistors in the scan driving circuit SD and emission driving circuit EDC and the transistors in the pixel circuit part PXC may be formed using different processes.

Each of the plurality of pixels PX receives, from the voltage generator 300, the first driving voltage ELVDD, the second driving voltage ELVSS, the first initialization voltage VINT1, and the second initialization voltage VINT2.

The scan driving circuit SD receives the scan control signal SCS from the driving controller 100. The scan driving circuit SD may output scan signals to the first scan lines GIL1 to GILn, the second scan lines GWL1 to GWLn, and the luminance control line CBL1 to CBLn in response to the scan control signal SCS. The configuration and operation of a circuit related to the luminance control lines CBL1 to CBLn will be described later in detail.

Figure 3:
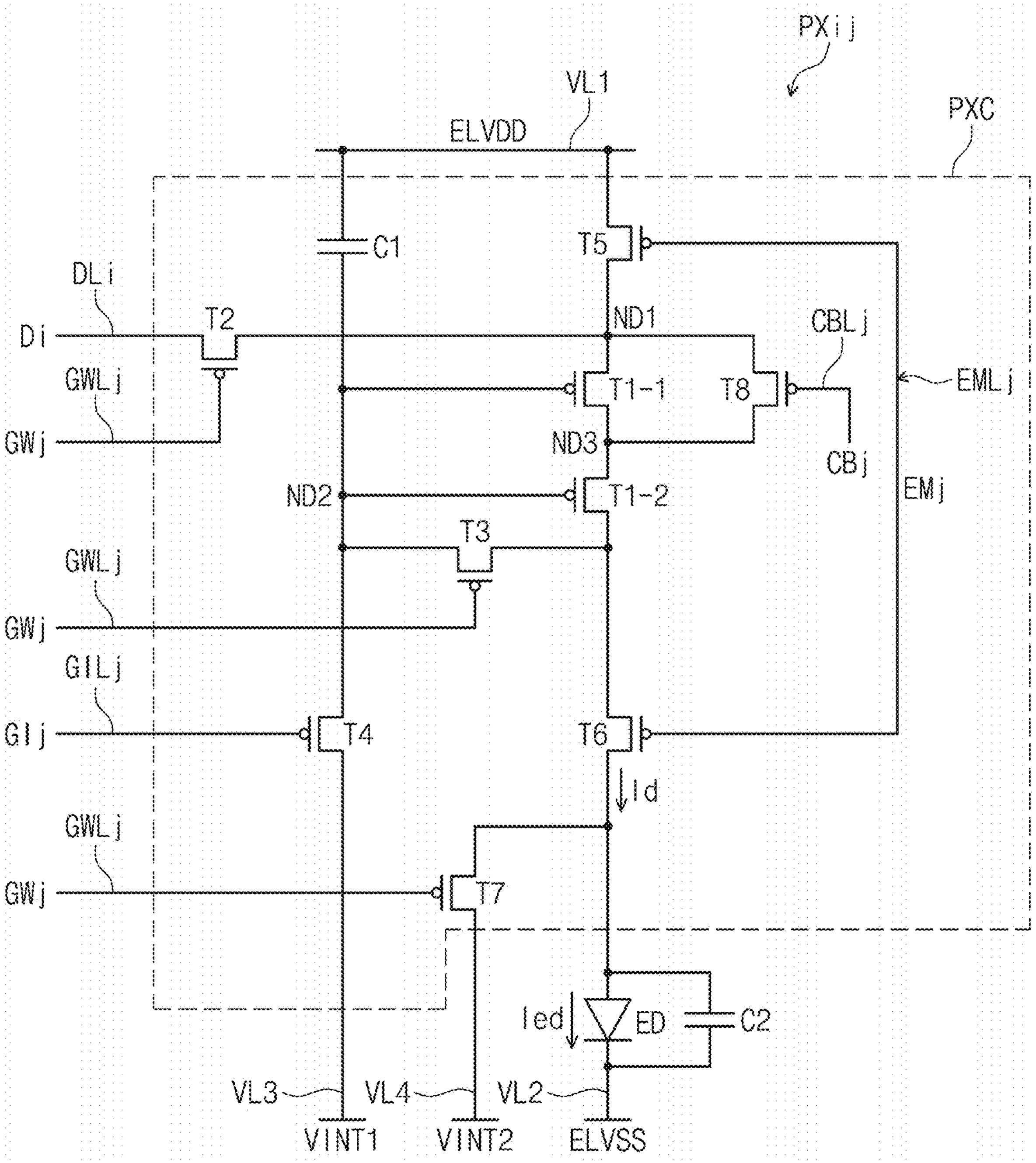
FIG. 3 is an equivalent circuit diagram of a pixel according to an embodiment of the inventive concept.

FIG. 3 is an equivalent circuit diagram of a pixel PXij according to an embodiment of the inventive concept. The pixel PXij may be representative of the structure of each pixel in the display panel.

FIG. 3 exemplarily illustrates an equivalent circuit diagram of the pixel PXij, which is connected to an i-th data line DLi among the data lines DLI to DLm, a j-th first scan line GILj among the first scan lines GIL1 to GILn, a j-th second scan line GWLj among the second scan lines GWL1 to GWLn, a j-th luminance control line CBLj among the luminance control lines CBL1 to CBLn, and a j-th emission control line EMLj among the emission control lines EML1 to EMLn, which are illustrated in FIG. 2.

Each of the plurality of pixels PX illustrated in FIG. 2 may have the same circuit configuration as the equivalent circuit diagram of the pixel PXij illustrated in FIG. 3. In this example, the pixel circuit part PXC of the pixel PXij may include (1-1)-th to eighth transistors T1-1, T1-2, T2, T3, T4, T5, T6, T7 and T8 and one or more capacitors, but may include a different number of transistors and/or capacitors in another embodiment.

Each of the (1-1)-th to eighth transistors T1-1 to T8 may be an N-type transistor including an oxide semiconductor as a semiconductor layer. However, an embodiment of the inventive concept is not limited thereto, and all the (1-1)-th to eighth transistors T1-1 to T8 may be P-type transistors. In another embodiment, among the (1-1)-th to eighth transistors T1-1 to T8, at least one may be an N-type transistor, and the others may be a P-type transistor. In addition, the circuit configuration of a pixel according to the inventive concept is not limited to FIG. 3. The pixel circuit part PXC illustrated in FIG. 3 is merely one example, and the configuration of the pixel circuit part PXC may be implemented with modification.

Referring to FIG. 3, the pixel PXij of a display device according to an embodiment includes the (1-1) to eighth transistors T1-1 to T8, a first capacitor C1, a second capacitor C2, and at least one light-emitting diode ED. In this embodiment, an example in which one pixel PXij includes one light-emitting diode ED is described.

The first scan line GILj may transfer a first scan signal GIj, the second scan line GWLj may transfer a second scan signal GWj, and the luminance control line CBLj may transfer a luminance signal CBj. The emission control line EMLj may transfer an emission signal EMj, and the data line DLi may transfer a data signal Di. The data signal Di may have a voltage level corresponding to the image information RGB which is input to the display device 1000 (e.g., see FIG. 2). First to fourth driving voltage lines VL1, VL2, VL3, and VL4 may respectively transfer a first driving voltage ELVDD, a second driving voltage ELVSS, a first initialization voltage VINT1, and a second initialization voltage VINT2.

The (1-1)-th transistor T1-1 may be electrically connected between the first voltage line VL1 and the light-emitting diode ED. The (1-1)-th transistor T1-1 includes a first electrode electrically connected to the first voltage line VL1 via the fifth transistor T5, a second electrode electrically connected to an anode of the light-emitting diode ED via the (1-2)-th transistor T1-2 and the sixth transistor T6, and a gate electrode connected to one end of the first capacitor C1. The first electrode may be connected to a first node ND1, the gate electrode may be connected to a second node ND2, and the second electrode may be connected to a third node ND3. Thus, the (1-1)-th transistor T1-1 may be electrically connected between the first node ND1 and the third node ND3. In addition, the first electrode of the (1-1)-th transistor T1-1 may be electrically connected to a first electrode of the eighth transistor T8, and the second electrode of the (1-1)-th transistor T1-1 may be electrically connected to a second electrode of the eighth transistor T8.

The (1-2)-th transistor T1-2 may be electrically connected between the third node ND3 and the light-emitting diode ED via the sixth transistor T6. The (1-2)-th transistor T1-2 includes a first electrode connected to the first voltage line VL1 via the fifth transistor T5 and the (1-1)-th transistor T1-1, a second electrode electrically connected to the anode of the light-emitting diode ED via the sixth transistor T6, and a gate electrode connected to the one end of the first capacitor C1, for example, at the second node ND2. The (1-1)-th transistor T1-1 and the (1-2)-th transistor T1-2 may operatively be referred to as a driving transistor, where the (1-1)-th transistor T1-1 may be considered to be a first driving sub-transistor and the (1-2)-th transistor T1-2 may be considered to be a second driving sub-transistor. In addition, the (1-1)-th transistor T1-1 may be referred to as a first driving transistor and the (1-2)-th transistor T1-2 may be referred to as a second driving transistor. As will be explained in greater detail below, the (1-1)-th transistor T1-1 may be electrically disconnected in some modes of operation.

The second transistor T2 may be electrically connected between the data line DLi and the first node ND1. The second transistor T2 operates as a switching transistor and includes a first electrode connected to the data line DLi, a second electrode connected to the first electrode of the (1-1)-th transistor T1-1 at node ND1, and a gate electrode connected to the second scan line GWLj. The second transistor T2 may be turned on in response to the second scan signal GWj transferred through the second scan line GWLj and may transfer the data signal Di transferred through the data line DLi to the first electrode of the (1-1)-th transistor T1-1.

The third transistor T3 may be electrically connected between the second node ND2 and the (1-2)-th transistor T1-2. The third transistor T3 includes a first electrode connected to respective gate electrodes of the (1-1)-th transistor T1-1 and the (1-2)-th transistor T1-2, a second electrode connected to the second electrode of the (1-2)-th transistor T1-2, and a gate electrode connected to the second scan line GWLj. The third transistor T3 may be turned on in response to the second scan signal GWj transferred through the second scan line GWLj to connect the gate electrode and the second electrode of each of the (1-1)-th transistor T1-1 and the (1-2)-th transistor T1-2. In this case, the (1-1)-th transistor T1-1 and the (1-2)-th transistor T1-2 may each be placed in a diode-connected state.

The fourth transistor T4 may be electrically connected between the second node ND2 and the third voltage line VL3. The fourth transistor T4 includes a first electrode connected to the respective gate electrodes of the (1-1)-th transistor T1-1 and the (1-2)-th transistor T1-2 (e.g., node ND2), a second electrode connected to the third voltage line VL3 through which the first initialization voltage VINT1 is transferred, and a gate electrode connected to the first scan line GILj. The fourth transistor T4 may be turned on in response to the first scan signal GIj transferred through the first scan line GILj, and may transfer the first initialization voltage VINT1 to the respective gate electrodes of the (1-1)-th transistor T1-1 and the (1-2)-th transistor T1-2 to perform an initialization operation of initializing a voltage of the gate electrode of each of the (1-1)-th transistor T1-1 and the (1-2)-th transistor T1-2.

The fifth transistor T5 may be electrically connected between the first voltage line VL1 and the first node ND1. The fifth transistor T5 includes a first electrode connected to the first voltage line VL1, a second electrode connected to the first electrode of the (1-1)-th transistor T1-1, and a gate electrode connected to the emission control line EMLj.

The sixth transistor T6 may be electrically connected between the (1-2)-th transistor T1-2 and the light-emitting diode ED. The sixth transistor T6 includes a first electrode connected to the second electrode of the (1-2)-th transistor T1-2, a second electrode connected to the anode of the light-emitting diode ED, and a gate electrode connected to the emission control line EMLj.

In operation, the fifth transistor T5 and the sixth transistor T6 may be turned on at the same time in response to the emission signal EMj transferred through the emission control line EMLj. In this case, a current path may be formed between the first voltage line VL1 and the light-emitting diode ED. Thus, the first driving voltage ELVDD may be compensated through the diode-connected (1-1)-th transistor T1-1 and/or (1-2)-th transistor T1-2 and transferred to the light-emitting diode ED.

The seventh transistor T7 may be electrically connected between the light-emitting diode ED and the fourth voltage line VLA. The seventh transistor T7 includes a first electrode connected to the second electrode of the sixth transistor T6, a second electrode connected to the fourth voltage line VL4 through which the second initialization voltage VINT2 is transferred, and a gate electrode connected to the second scan line GWLj. The seventh transistor T7 is turned on in response to the second scan signal GWj transferred through the second scan line GWLj, so that a current of the anode of the light-emitting diode ED bypasses to the fourth voltage line VLA.

The eighth transistor T8 may be electrically connected between the first node ND1 and the third node ND3 in parallel with the (1-1)-th transistor T1-1. The eighth transistor T8 includes a first electrode electrically connected to the first electrode of the (1-1)-th transistor T1-1, a second electrode electrically connected to the second electrode of the (1-1)-th transistor T1-1, and a gate electrode connected to the luminance control line CBLj to which the luminance signal CBj is provided. The eighth transistor T8 may be referred to as a luminance transistor.

The first capacitor C1 may have one end connected to the respective gate electrodes of the (1-1)-th transistor T1-1 and the (1-2)-th transistor T1-2 as described above and second node ND2, and the other end of the first capacitor C1 may be connected to the first voltage line VL1.

The second capacitor C2 may have one end connected to a cathode of the light-emitting diode ED, and the other end of the second capacitor C2 may be connected to the anode of the light-emitting diode ED. The second capacitor C2 may be a capacitor formed by the light-emitting diode ED.

The cathode of the light-emitting diode ED may be connected to the second voltage line VL2, which transfers the second driving voltage ELVSS. The structure of the pixel PXij according to an embodiment is not limited to the structure illustrated in FIG. 3, and the number of transistors and the number of capacitors, which are included in one pixel PXij, and connection relationship thereof may be modified in various ways.

In an embodiment of the inventive concept, the (1-1)-th transistor T1-1 and the (1-2)-th transistor T1-2 may be turned on in response to a voltage of the second node ND2. A first current path may be formed along the fifth transistor T5, the (1-1)-th transistor T1-1, the (1-2)-th transistor T1-2, and the sixth transistor T6. The (1-1)-th transistor T1-1 and the (1-2)-th transistor T1-2 may receive the data signal Di transferred through the data line DLi and supply an emission current led to the light-emitting diode ED. Here, the (1-1)-th transistor T1-1 and the (1-2)-th transistor T1-2 may operate as a single driving transistor. A channel length of the driving transistor may be equal to a sum of a first channel length of the (1-1)-th transistor T1-1 and a second channel length of the (1-2)-th transistor T1-2. The driving method may be defined as a first mode. Description thereof will be made later.

In an embodiment of the inventive concept, when the eighth transistor T8 is activated, a second current path may be formed along the fifth transistor T5, the eighth transistor T8, the (1-2)-th transistor T1-2, and the sixth transistor T6. The second current path may be different from the first current path. The (1-2)-th transistor T1-2 may receive the data signal Di transferred through the data line DLi and supply the emission current led to the light-emitting diode ED. Here, only the (1-2)-th transistor T1-2 may operate as the driving transistor because the (1-1)-th transistor T1-1 has been electrically shorted through the on state of the eighth transistor T8. A channel length of the driving transistor may be the second channel length of the (1-2)-th transistor T1-2.

The driving method may be defined as a third mode. Description thereof will be made later.

According to the inventive concept, a channel length of a driving transistor in the third mode may be shorter than a channel length of a driving transistor in the first mode. Accordingly, the emission current Ied flowing through the light-emitting diode ED in the third mode may be greater than the emission current Ied flowing through the light-emitting diode ED in the first mode. The pixel PXij which operates in the third mode may have higher luminance than the pixel PXij which operates in the first mode. Thus, the pixel PXij may be a pixel which is easily driven at high luminance.

Figure 4:
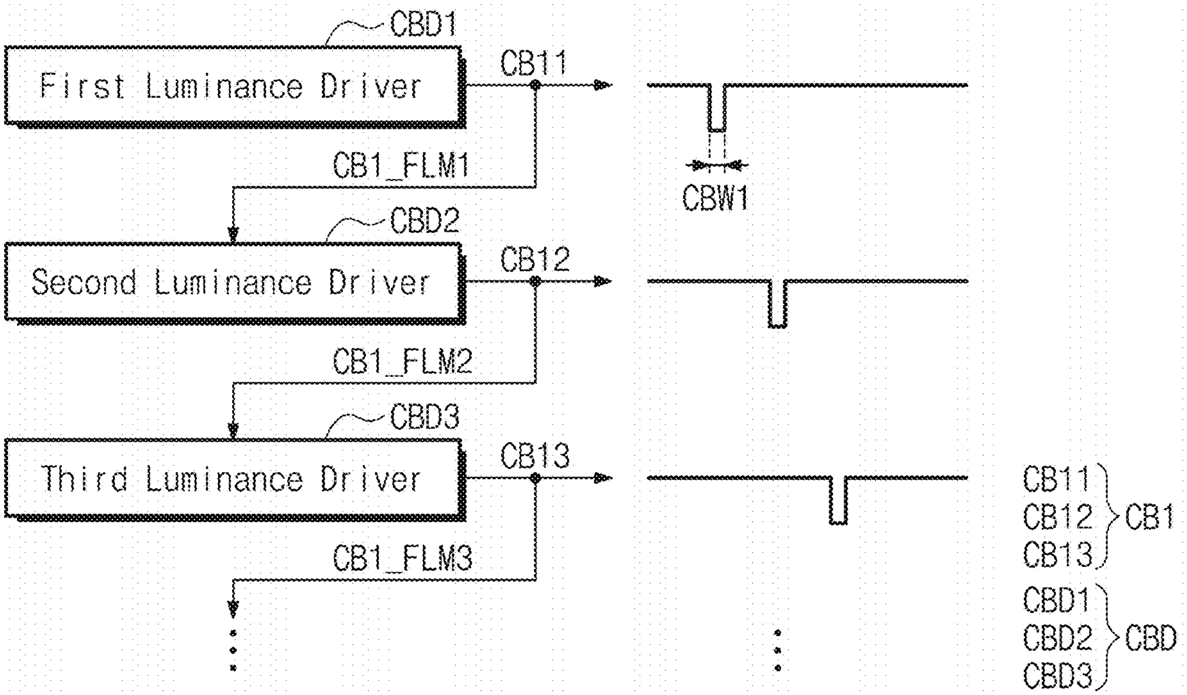
FIGS. 4 and 5 are views illustrating a luminance driver of a display device according to an embodiment of the inventive concept.
Figure 5:
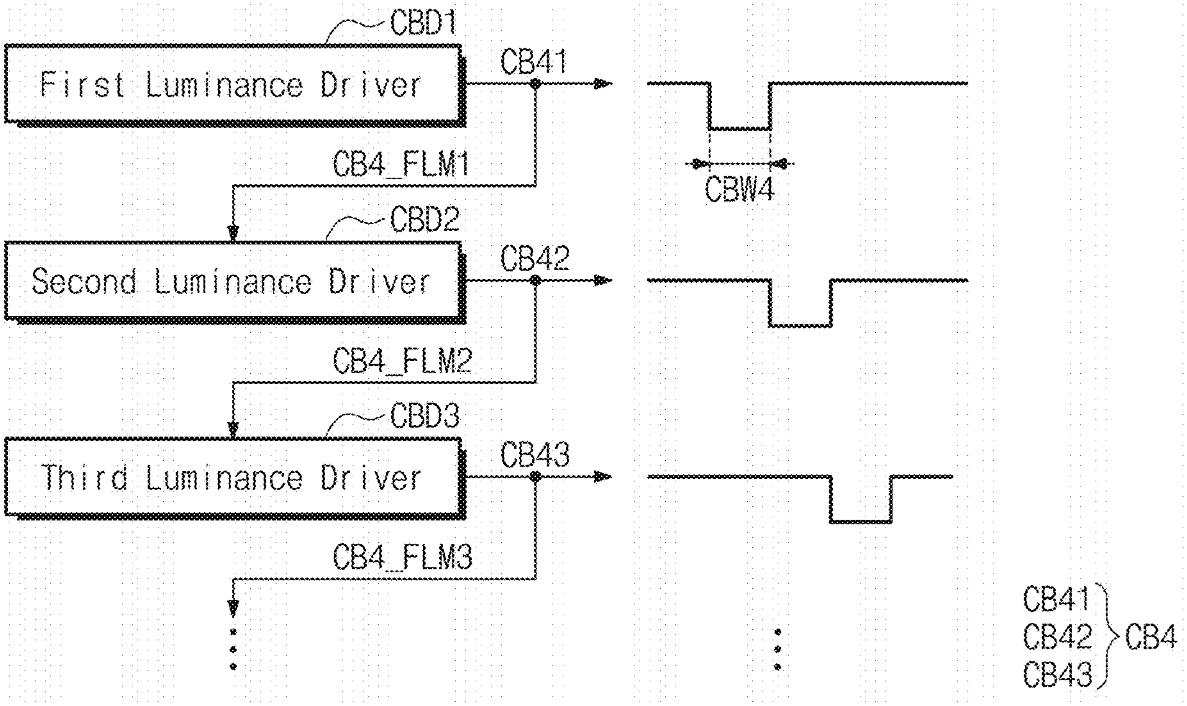

FIGS. 4 and 5 are views illustrating a luminance driver CBD of a display device according to an embodiment of the inventive concept.

Referring to FIGS. 2, 4, and 5, the scan driving circuit SD may further include a plurality of luminance drivers CBD which operate sequentially. The plurality of luminance drivers CBD may include a first luminance driver CBD1, a second luminance driver CBD2, and a third luminance driver CBD3. Each of FIGS. 4 and 5 illustrate three luminance drivers, but an embodiment of the inventive concept is not limited thereto, e.g., the less or greater than three luminance drivers may be included in the scan driving circuit SD.

Each of the plurality of luminance drivers CBD may provide a first luminance signal CB1 to the plurality of pixels PX during a first frame. The first luminance signal CB1 may include a (1-1)-th luminance signal CB11, a (1-2)-th luminance signal CB12, and a (1-3)-th luminance signal CB13. Each of the (1-1)-th luminance signal CB11, the (1-2)-th luminance signal CB12, and the (1-3)-th luminance signal CB13 may be activated to have a first pulse width CBW1.

The first luminance driver CBD1 may provide the (1-1)-th luminance signal CB11 to the pixels in the first row in response to the scan control signal SCS, and provide a (1-1)-th start signal CB1_FLM1 as a carry signal to the second luminance driver CBD2. In one embodiment, the (1-1)-th luminance signal CB11 may be the same as the (1-1)-th start signal CB1_FLM1.

The second luminance driver CBD2 may provide the (1-2)-th luminance signal CB12 to pixels in a second row in response to the (1-1)-th start signal CB1_FLM1, and provide a (1-2)-th start signal CB1_FLM2 as a carry signal to the third luminance driver CBD3. In one embodiment, the (1-2)-th luminance signal CB12 may be the same as the (1-2)-th start signal CB1_FLM2.

The second luminance driver CBD2 may output the (1-2)-th luminance signal CB12, which is activated after the (1-1)-th luminance signal CB11 output from the first luminance driver CBD1 is activated.

The third luminance driver CBD3 may provide the (1-3)-th luminance signal CB13 to pixels in a third row in response to the (1-2)-th start signal CB1_FLM2, and provide a (1-3)-th start signal CB1_FLM3 as a carry signal to a next luminance driver. In one embodiment, the (1-3)-th luminance signal CB13 may be the same as the (1-3)-th start signal CB1_FLM3.

The third luminance driver CBD3 may output the (1-3)-th luminance signal CB13, which is activated after the (1-2)-th luminance signal CB12 output from the second luminance driver CBD2 is activated.

Each of the plurality of luminance drivers CBD may provide a fourth luminance signal CB4 to the plurality of pixels PX during a fourth frame. The fourth luminance signal CB4 may include a (4-1)-th luminance signal CB41, a (4-2)-th luminance signal CB42, and a (4-3)-th luminance signal CB43. Each of the (4-1)-th luminance signal CB41, the (4-2)-th luminance signal CB42, and the (4-3)-th luminance signal CB43 may be activated to have a fourth pulse width CBW4. The fourth pulse width CBW4 may be greater than the first pulse width CBW1.

The first luminance driver CBD1 may provide the (4-1)-th luminance signal CB41 to the pixels in the first row in response to the scan control signal SCS, and provide a (4-1)-th start signal CB4_FLM1 as a carry signal to the second luminance driver CBD2. In one embodiment, the (4-1)-th luminance signal CB41 may be the same as the (4-1)-th start signal CB4_FLM1.

The second luminance driver CBD2 may provide the (4-2)-th luminance signal CB42 to the pixels in the second row in response to the (4-1)-th start signal CB4_FLM1, and provide a (4-2)-th start signal CB4_FLM2 as a carry signal to the third luminance driver CBD3. In one embodiment, the (4-2)-th luminance signal CB42 may be the same as the (4-2)-th start signal CB4_FLM2.

The second luminance driver CBD2 may output the (4-2)-th luminance signal CB42, which is activated after the (4-1)-th luminance signal CB41 output from the first luminance driver CBD1 is activated.

The third luminance driver CBD3 may provide the (4-3)-th luminance signal CB43 to the pixels in the third row in response to the (4-2)-th start signal CB4_FLM2, and provide a (4-3)-th start signal CB4_FLM3 as a carry signal to a next luminance driver. In one embodiment, the (4-3)-th luminance signal CB43 may be the same as the (4-3)-th start signal CB4_FLM3.

The third luminance driver CBD3 may output the (4-3)-th luminance signal CB43, which is activated after the (4-2)-th luminance signal CB42 output from the second luminance driver CBD2 is activated.

Figure 6:
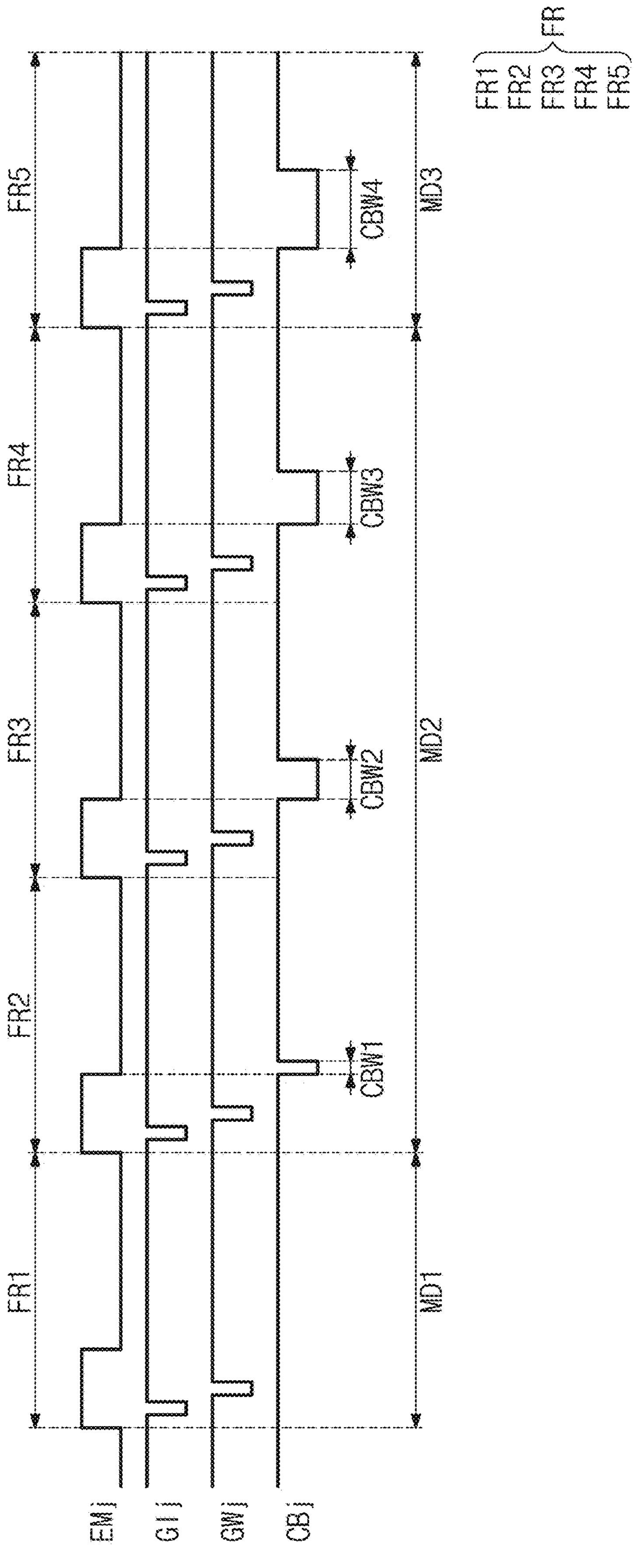
FIG. 6 is a timing diagram illustrating an operation of a pixel according to an embodiment of the inventive concept.

FIG. 6 is a timing diagram illustrating an operation of the pixel PXij according to an embodiment of the inventive concept. FIG. 6 exemplarily illustrates a process in which the display panel DP (e.g., see FIG. 2) is driven in a normal mode, an intermediate mode, and a high luminance mode sequentially. For example, FIG. 6 illustrates an operation when the normal mode changes to the high luminance mode.

Referring to FIGS. 2, 3, and 6, the display panel DP may be driven in units of frames FR. The frames FR may include a first frame FR1, a second frame FR2, a third frame FR3, a fourth frame FR4, and a fifth frame FR5, which are consecutively ordered.

The display panel DP may be driven in a first mode MD1, a second mode MD2, and a third mode MD3. The first mode MD1 may be referred to as the normal mode. The second mode MD2 may be referred to as the intermediate mode. The third mode MD3 may be referred to as the high luminance mode. The second mode MD2 may be disposed between the first mode MD1 and the third mode MD3.

The display panel DP may be driven in the first mode MD1 for the first frame FR1, may be driven in the second mode MD2 for the second to fourth frames FR2 to FR4, and may be driven in the third mode MD3 for the fifth frame FR5. FIG. 6 illustrates the second mode MD2 in which the display panel is driven for three frames as an example, but the number of frames for which the display panel operates in the second (intermediate) mode MD2 according to an embodiment of the inventive concept is not limited thereto, and may be a number of frames greater than or less than three frames.

In operation, the emission signal EMj, the first scan signal GIj, the second scan signal GWj, and the luminance signal CBj may be provided to the pixel PXij. An activation level of each of the emission signal EMj, the first scan signal GIj, the second scan signal GWj, and the luminance signal CBj may be a low level to match the conductivity (e.g., PMOS) of corresponding ones of the transistors. However, this is an example, and an activation level of a signal according to an embodiment of the inventive concept is not limited thereto. For example, an activation level of at least one among the emission signal EMj, the first scan signal GIj, the second scan signal GWj, and the luminance signal CBj may be a high level, for example, in an NMOS configuration.

Referring to FIGS. 3 and 6, during an initialization period in the first frame FR1, an activated first scan signal GIj may be provided through the first scan line GILj. In response to the activated first scan signal GIj, the fourth transistor T4 may be turned on, and the first initialization voltage VINT1 may be transferred to the respective gate electrodes of the (1-1)-th transistor T1-1 and the (1-2)-th transistor T1-2 and second node ND2 through the fourth transistor T4. As a result, the gate electrodes of respective ones of the (1-1)-th transistor T1-1 and the (1-2)-th transistor T1-2 may be initialized.

Next, when an activated second scan signal GWj is supplied through the second scan line GWLj during a data programming and compensation period in the first frame FR1, the third transistor T3 is turned on. The (1-1)-th transistor T1-1 and the (1-2)-th transistor T1-2 are placed in a diode-connected state by the turned-on transistor T3 and forward-biased. In addition, the second transistor T2 is turned on by the activated second scan signal GWj. Then, a compensation voltage (denoted as Di-Vth) is applied to the second node ND2. The compensation voltage Di-Vth is obtained by subtracting a threshold voltage (denoted as Vth) of the (1-1)-th transistor T1-1 and the (1-2)-th transistor T1-2 from the data signal Di supplied from the data line DLi. Thus, a gate voltage applied to the gate electrode of each of the (1-1)-th transistor T1-1 and the (1-2)-th transistor T1-2 may become the compensation voltage Di-Vth.

The first driving voltage ELVDD and the compensation voltage Di-Vth may be applied to respective ends of the first capacitor C1, and charges corresponding to a voltage difference between the ends may be stored in the first capacitor C1.

Meanwhile, the seventh transistor T7 is turned on by receiving the activated second scan signal GWj through the second scan line GWLj. Due to the seventh transistor T7, a portion of a driving current Id may escape through the seventh transistor T7 as a bypass current.

Unlike the inventive concept, if the light-emitting diode ED emits light even when a minimum current of the (1-1)-th transistor T1-1 and the (1-2)-th transistor T1-2 at which a black image is displayed flows as the driving current, a black image is not properly displayed. However, the seventh transistor T7 in the pixel PXij according to an embodiment of the inventive concept may distribute, as the bypass current, a portion of the minimum current of the (1-1)-th transistor T1-1 and the (1-2)-th transistor T1-2 to a current path other than a current path on a light-emitting diode side. In one embodiment, the minimum current of the (1-1)-th transistor T1-1 and the (1-2)-th transistor T1-2 may correspond to a current that flows under a condition that the (1-1)-th transistor T1-1 and the (1-2)-th transistor T1-2 are turned off, since a gate-source voltage (denoted as Vgs) of the (1-1)-th transistor T1-1 and the (1-2)-th transistor T1-2 is less than the threshold voltage Vth. A minimum driving current (e.g., a current of about 10 pA or less) under such condition that the (1-1)-th transistor T1-1 and the (1-2)-th transistor T1-2 are turned off is transferred to the light-emitting diode ED, and an image having black luminance is displayed.

It can be said that there is a substantial effect of a bypass transfer of the bypass current when a minimum driving current (at which a black image is displayed) flows, whereas there is almost no effect of the bypass current when a large driving current at which an image (such as a normal image or a white image is displayed) flows. Accordingly, when the driving current at which a black image is displayed flows, the emission current Ied of the light-emitting diode ED (which is reduced by a current amount of the bypass current which escapes through the seventh transistor T7 from the driving current Id) has a minimum current amount at a level at which a black image may be clearly shown. Thus, an accurate black luminance image may be achieved by using the seventh transistor T7, and also contrast ratio may be improved. In this embodiment, a bypass signal is the activated second scan signal GWj, but an embodiment of the inventive concept is not necessarily limited thereto.

Next, during an emission period in the first frame FR1, the emission signal EMj supplied from the emission control line EMLj changes from a high level to a low level. A period in which the emission signal EMj has the low level may be the emission period. During the emission period, the fifth transistor T5 and the sixth transistor T6 are turned on by the emission signal EMj having the low level. Then, the driving current Id corresponding to a voltage difference between a gate voltage of the gate electrode of each of the (1-1)-th transistor T1-1 and the (1-2)-th transistor T1-2 and the first driving voltage ELVDD is generated and supplied to the light-emitting diode ED through the sixth transistor T6. As a result, the emission current Ied flows through the light-emitting diode ED. Here, the pixel PXij may emit light having a first luminance value, e.g., the display panel DP may have the first luminance value in the first mode MD1.

In the first mode MD1, an activated luminance signal CBj may not be provided to the gate electrode of the eighth transistor T8 in the first frame FR1. As a result, the eighth transistor T8 may be deactivated. That is, the luminance signal CBj may be deactivated in the first mode MD1, and as a result, the eighth transistor T8 may be deactivated and driving current may be generated as a result of both driving sub-transistors (1-1)-th transistor T1-1 and (1-2)-th transistor T1-2 being turned on. In an embodiment, both driving sub-transistors (1-1)-th transistor T1-1 and (1-2)-th transistor may also be referred to as a combined driving transistor.

As previously indicated, in this case, the combined driving transistor has a channel length equal to a sum of the channel lengths of sub-driving transistors T1-1 and T1-2. As a result, the pixel may emit light at a relatively lower luminance compared to the third mode MD3. This lower luminance may also be generated by a relatively short pulse width of the luminance signal CBj during this time, as described in greater detail below.

More specifically, in the first frame FR1 in which an operation is carried out in the first mode MD1, the (1-1)-th transistor T1-1 and the (1-2)-th transistor T1-2 may be turned on in response to a voltage of the second node ND2. A first current path may be formed along the fifth transistor T5, the (1-1)-th transistor T1-1, the (1-2)-th transistor T1-2, and the sixth transistor T6. The (1-1)-th transistor T1-1 and the (1-2)-th transistor T1-2 may supply the driving current Id to the light-emitting diode ED. Here, the (1-1)-th transistor T1-1 and the (1-2)-th transistor T1-2 may operate as a single driving transistor. A channel length of the driving transistor may be a sum of a first channel length of the (1-1)-th transistor T1-1 and a second channel length of the (1-2)-th transistor T1-2. During the first mode MD1, the pixel PXij may emit light having the first (or lower) luminance value.

Driving of the pixel PXij during the initialization period and data programing and compensation period in the second to fifth frames FR2 to FR5 may be performed in same manner as that in the first frame FR1. Thus, a description thereof will be omitted.

During the emission period in the second to fifth frames FR2 to FR5, the emission signal EMj supplied from the emission control line EMLj changes from a high level to a low level. The fifth transistor T5 and the sixth transistor T6 are turned on by the emission signal EMj. In addition, during the emission period in the second to fifth frames FR2 to FR5, the eighth transistor T8 may be activated. The eighth transistor T8 may be turned on in response to an activated luminance signal CBj. When the eighth transistor T8 is turned on, the (1-1)-th transistor T1-1 is effectively shorted out, but the (1-2)-th transistor T1-2 is turned on. As a result, the driving current Id is generated to correspond to a voltage difference between a gate voltage of the gate electrode of the (1-2)-th transistor T1-2 and the first driving voltage ELVDD. The resulting driving current Id is supplied to the light-emitting diode ED through the sixth transistor T6, and the emission current led flows through the light-emitting diode ED.

As shown in FIG. 6, the luminance signal CBj may have a pulse width the progressively increases from the second frame FR2 to the fifth frame FR5. For example, the luminance signal CBj may have a first pulse width CBW1 in the second frame FR2, may have a second pulse width CBW2 in the third frame FR3, and may have a third pulse width CBW3 in the fourth frame FR4. Here, the second pulse width CBW2 may be greater than the first pulse width CBW1 and less than the third pulse width CBW3. As a result, the display panel DP may have, in the second frame FR2, a second luminance value which is greater than the first luminance value in the first frame FR1, may have a third luminance value in the third frame FR3, and may have a fourth luminance value in the fourth frame FR4. Here, the third luminance value may be greater than the second luminance value and less than the fourth luminance value. Thus, in the second mode MD2, the display panel DP may be gradually or progressively brightened from the second luminance value to the fourth luminance value which is greater than the second luminance value.

In the third mode MD3, the luminance signal CBj may be activated in the fifth frame FR5 while having a fourth pulse width CBW4. Here, the fourth pulse width CBW4 may be greater than the third pulse width CBW3, e.g., the first to fourth pulse widths CBW1 to CBW4 may be progressively increased in a sequential manner. In subsequent frames, the luminance signal CBj may be activated while having the fourth pulse width CBW4. The luminance of the display panel DP may have a fifth luminance value in the fifth frame FR5. The fifth luminance value may be greater than the fourth luminance value. Thus, the luminance values may sequentially increase from the first mode MD1 to the third mode MD3.

A second current path may be formed along the fifth transistor T5, the eighth transistor T8, the (1-2)-th transistor T1-2, and the sixth transistor T6 in a frame in which an operation is carried out in the second mode MD2 and the third mode MD3. This is because the (1-1)-th transistor T1-1 is effectively shorted out when transistor T8 is turned on. In this case, the (1-2)-th transistor T1-2 may supply the emission current led to the light-emitting diode ED. Here, only the (1-2)-th transistor T1-2 may operate as a driving transistor. As a result, the channel length of the driving transistor may be the second channel length of the (1-2)-th transistor T1-2.

According to the inventive concept, the channel length of the driving transistor in the third mode MD3 may be less than the channel length of the driving transistor in the first mode MD1. Accordingly, the emission current led flowing through the light-emitting diode ED in the third mode MD3 may be greater than the emission current led flowing through the light-emitting diode ED in the first mode MD1. As a result, the pixel PXij which operates in the third mode MD3 may have higher luminance than the pixel PXij which operates in the first mode MD1. Thus, the pixel PXij may be a pixel that is easily driven at high luminance in the third mode MD3.

If the display panel is driven in the first mode MD1 and the third mode MD3 consecutively without being driven in the second mode MD2, e.g., the first frame FR1 and the fifth frame FR5 may be driven consecutively. Here, because the luminance of a display panel DP may rapidly change from the first luminance value to the fifth luminance value, a deviation in luminance may be visually recognized by a user. However, according to the inventive concept, the display panel DP may be driven in the first mode MD1, the second mode MD2, and the third mode MD3. For example, at least one frame may be inserted between the first and last frames, e.g., the first to fifth frames FR1 to FR5 may be driven consecutively. As the pulse width of the luminance signal CBj becomes progressively greater, the luminance of the pixel PXij may become higher in a corresponding manner. That is, as a frame proceeds during the second mode MD2, the luminance of the pixel PXij may be gradually increased. Accordingly, the luminance of the display panel DP may be gradually increased from the first luminance value to the higher fifth luminance value. As a result, a deviation in luminance may thus not be visually recognized by a user. Thus, the display device 1000 may be provided to have a display panel DP with improved display quality.

Figure 7:
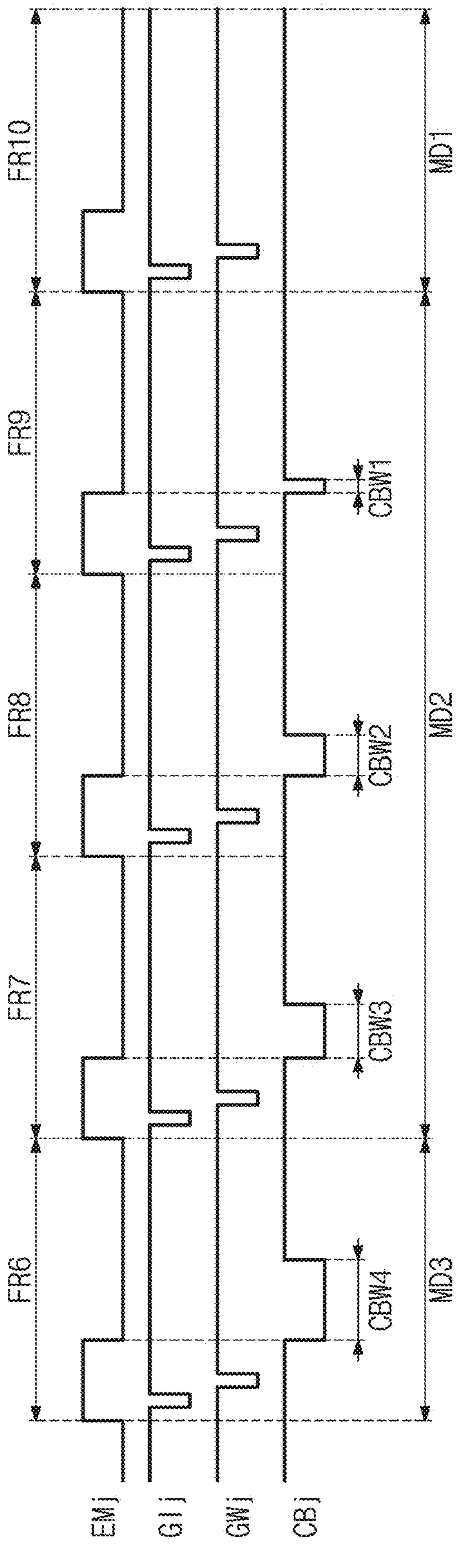
FIG. 7 is a timing diagram illustrating an operation of a pixel according to an embodiment of the inventive concept.

FIG. 7 is a timing diagram illustrating an operation of the pixel PXij according to an embodiment of the inventive concept. FIG. 7 exemplarily illustrates a process in which the display panel DP (e.g., see FIG. 2) is driven in a high luminance mode, an intermediate mode, and a normal mode sequentially. That is, FIG. 7 illustrates an operation when the high luminance mode changes to the normal mode. In description of FIG. 7, the same reference numerals or symbols are used for components described with reference to FIG. 6, and description thereof is omitted.

Referring to FIGS. 2, 3, and 7, the display panel DP may be driven in units of frames FR. The frames FR may further include sixth to tenth frames FR6, FR7, FR8, FR9, and FR10.

The display panel DP may be driven in the third mode MD3 for the sixth frame FR6, may be driven in the second mode MD2 for one or more frames (e.g., seventh to nineth frames FR7 to FR9), and may be driven in the first mode MD1 for the tenth frame FR10.

The luminance signal CBj may be activated in the sixth frame FR6 to have a predetermined width, e.g., fourth pulse width CBW4. The display panel DP may have a high luminance value (e.g., the fifth luminance value) in the sixth frame FR6.

When the second mode MD2 has three frames, the luminance signal CBj may have a third pulse width CBW3 in the seventh frame FR7, may have a second pulse width CBW2 in the eighth frame FR8, and may have a first pulse width CBW1 in the nineth frame FR9. During the seventh to ninth frames FR7 to FR9, pulse widths of the luminance signal CBj may be progressively decreased. For example, the display panel DP may have, in the seventh frame FR7, a fourth luminance value which is lower than the fifth luminance value, may have a third luminance value in the eighth frame FR8, and may have a second luminance value in the nineth frame FR9. Here, the third luminance value may be greater than the second luminance value and less than the fourth luminance value. Thus, in the second mode MD2, the luminance of the display panel DP may be progressively decreased from the fourth luminance value to the second luminance value.

An activated luminance signal CBj may not be provided to the gate electrode of the eighth transistor T8 in the tenth frame FR10. As a results, the eighth transistor T8 may thus be deactivated. In this case, the luminance signal CBj may be deactivated in the first mode MD1, and the eighth transistor T8 may be deactivated. In subsequent frames, the luminance signal CBj may be deactivated. In the tenth frame FR10, the display panel DP may emit light having a first luminance value which is less than the second luminance value as a result of both transistors, (1-1)-th transistor 1-1 and (1-2)-th transistor 1-2, being on.

According to the inventive concept, the channel length of the driving transistor of pixel PXij in the third mode MD3 may be less than the channel length of the driving transistor in the first mode MD1. As a result, the emission current led flowing through the light-emitting diode ED in the third mode MD3 may be greater than the emission current led flowing through the light-emitting diode ED in the first mode MD1. The pixel PXij which operates in the third mode MD3 may have higher luminance than the pixel PXij which operates in the first mode MD1. Thus, the pixel PXij which is easily driven at high luminance may be provided.

In a case where a display panel is driven in the third mode MD3 and the first mode MD1 consecutively without being driven in the second mode MD2, a perceptible deviation in luminance may occur. That is, in the case where the sixth frame FR6 and the tenth frame FR10 are driven consecutively, the luminance of the display panel DP may rapidly change from the fifth luminance value to the first luminance value. As a result, a deviation in luminance may be visually recognized by a user.

However, according to the inventive concept, the display panel DP may be driven to include a mode between the third mode MD3 and the first mode MD1, e.g., in the third mode MD3, the second mode MD2, and the first mode MD1. That is, at least one frame may be included between the first and the last frames, e.g., the sixth to tenth frames FR6 to FR10 may be driven consecutively. As the pulse width of the luminance signal CBj becomes smaller, the luminance of the pixel PXij may become lower. That is, as a frame proceeds during the second mode MD2, the luminance of the pixel PXij may be gradually or progressively decreased. Accordingly, the luminance of the display panel DP may be gradually decreased from the fifth luminance value to the first luminance value. As a result, a deviation in luminance may not be visually recognized by a user. Thus, the display device 1000 including the display panel DP having improved display quality may be provided.

According to description above, a display panel may be driven in a first mode, a second mode, and a third mode consecutively. As at least one frame proceeds during the second mode, the luminance of the pixel may gradually change. Accordingly, the luminance of the display panel may gradually change, and a deviation in luminance may not be visually recognized by a user. Thus, a display device including a display panel having improved display quality may be provided.

Although the embodiments of the inventive concept have been described, it is understood that the inventive concept should not be limited to these embodiments, but various changes and modifications may be made by one ordinary skilled in the art within the spirit and scope of the inventive concept as hereinafter claimed. Therefore, the technical scope of the inventive concept is not limited to the contents described in the detailed description of the specification, but should be defined by the accompanying claims. The embodiments may be combined to form additional embodiments.

What is claimed is:

1. A display device comprising:

a display panel which is driven in units of frames and includes a pixel including a pixel driving circuit and a light-emitting element electrically connected to the pixel driving circuit, wherein the pixel driving circuit includes:

a first capacitor connected between a second node and a first voltage line to which a first driving voltage is provided;

a (1-1)-th transistor including a first electrode electrically connected to the first voltage line and connected to a first node, a second electrode electrically connected to a third node, and a gate electrode electrically connected to the second node;

a (1-2)-th transistor including a first electrode electrically connected to the third node, a second electrode electrically connected to the light-emitting element, and a gate electrode electrically connected to the second node; and a luminance transistor including a first electrode electrically connected to the first node, a second electrode electrically connected to the third node, and a gate electrode configured to receive a luminance signal, wherein the frames include a first frame and a second frame in series, and wherein the luminance signal is activated in the first frame to have a first pulse width and is activated in the second frame to have a second pulse width different from the first pulse width.

2. The display device of claim 1, wherein the display panel has a first luminance value in the first frame and has, in the second frame, a second luminance value which is greater than the first luminance value, and the second pulse width is greater than the first pulse width.

3. The display device of claim 2, wherein the frames further comprise a third frame which is consecutive to the second frame, and a fourth frame which is consecutive to the third frame, and wherein the luminance signal is activated in the third frame to have a third pulse width and is activated in the fourth frame to have a fourth pulse width different from the third pulse width.

4. The display device of claim 3, wherein the display panel has, in the third frame, a third luminance value which is greater than the second luminance value and has, in the fourth frame, a fourth luminance value which is greater than the third luminance value.

5. The display device of claim 4, wherein the first pulse width to the fourth pulse width progressively increase in order.

6. The display device of claim 1, wherein the frames further comprise a fifth frame, a sixth frame, a seventh frame, and an eighth frame, which are driven consecutively, the luminance signal is activated in the fifth frame to have a fifth pulse width, is activated in the sixth frame to have a sixth pulse width, is activated in the seventh frame to have a seventh pulse width, and is activated in the eighth frame to have an eighth pulse width, and the fifth pulse width to the eighth pulse width are different from each other.

7. The display device of claim 6, wherein the display panel has a fifth luminance value in the fifth frame, a sixth luminance value in the sixth frame, a seventh luminance value in the seventh frame, and an eighth luminance value in the eighth frame, and the fifth luminance value to the eighth luminance value progressively decrease in order.

8. The display device of claim 6, wherein the fifth pulse width to the eighth pulse width progressively decrease in order.

9. The display device of claim 1, wherein the pixel driving circuit further comprises a second transistor including a first electrode electrically connected to a data line to which a data signal is provided, a second electrode electrically connected to the first node, and a gate electrode configured to receive a first scan signal.

10. The display device of claim 9, wherein the pixel driving circuit further comprises a third transistor including a first electrode electrically connected to the second node, a second electrode electrically connected to the second electrode of the (1-2)-th transistor, and a gate electrode configured to receive the first scan signal.

11. The display device of claim 1, wherein the pixel driving circuit further comprises a fourth transistor including a first electrode electrically connected to the second node, a second electrode electrically connected to a first initialization voltage line to which a first initialization voltage is provided, and a gate electrode configured to receive a second scan signal.

12. An electronic device comprising:

a display device comprising a display panel which is driven in units of frames and includes a pixel including a pixel driving circuit and a light-emitting element electrically connected to the pixel driving circuit, wherein the pixel driving circuit includes:

a (1-1)-th transistor electrically connected to a first voltage line to which a first driving voltage is provided, electrically connected between a first node and a second node, and including a gate electrode;

a (1-2)-th transistor electrically connected between the second node and the light-emitting element and including a gate electrode electrically connected to the gate electrode of the (1-1)-th transistor; and a luminance transistor which is electrically connected between the first node and the second node and is configured to receive a luminance signal, the display panel is driven in a first mode, a second mode, and a third mode, in the first mode, the (1-1)-th transistor and the (1-2)-th transistor are activated, and the display panel has a first luminance value, in the second mode, the (1-2)-th transistor and the luminance transistor are activated, and the display panel progressively changes in luminance value from the first luminance value to a second luminance value which is different from the first luminance value, and in the third mode, the (1-1)-th transistor and the luminance transistor are activated, and the display panel has the second luminance value.

13. The electronic device of claim 12, wherein the second luminance value is greater than the first luminance value.

14. The electronic device of claim 12, wherein:

the luminance signal is deactivated in the first mode, and the luminance signal is activated in the second mode and the third mode.

15. The electronic device of claim 12, wherein the second mode is disposed between the first mode and the third mode.

16. The electronic device of claim 12, wherein:

the second mode is driven for a plurality of second frames, and pulse widths of the luminance signal activated in each of the plurality of second frames are progressively increased.

17. The electronic device of claim 16, wherein:

the third mode is driven for a third frame, and a pulse width of the luminance signal activated in the third frame is greater than the pulse widths of the luminance signal activated in each of the plurality of second frames.

18. The electronic device of claim 12, wherein the pixel driving circuit further comprises a second transistor which is electrically connected between a data line to which a data signal is provided and the first node and is configured to receive a first scan signal.

19. The electronic device of claim 18, wherein the pixel driving circuit further comprises a third transistor which is electrically connected between the gate electrode of the (1-1)-th transistor and the (1-2)-th transistor and is configured to receive the first scan signal.

20. The electronic device of claim 12, wherein the pixel driving circuit further comprises a fourth transistor which is electrically connected between the gate electrode of the (1-2)-th transistor and a first initialization voltage line to which a first initialization voltage is provided, and is configured to receive a second scan signal.

* * * * *